United States Patent [19]

Becker

[11] Patent Number: 4,541,772
[45] Date of Patent: Sep. 17, 1985

[54] PUMP WITH MAGNETIC BEARINGS

[75] Inventor: Willi Becker, Braunfels, Fed. Rep. of Germany

[73] Assignee: Arthur Pfeiffer Vakuumtechnik Wetzlar GmbH, Asslar, Fed. Rep. of Germany

[21] Appl. No.: 543,264

[22] Filed: Oct. 19, 1983

[30] Foreign Application Priority Data

Oct. 23, 1982 [DE] Fed. Rep. of Germany ....... 3239328

[51] Int. Cl.⁴ .......................... F01D 1/36; F04D 29/66
[52] U.S. Cl. ...................................... 415/90; 415/119; 415/170 R; 308/10
[58] Field of Search .................... 415/90, 119, 170 R, 415/10, 142; 308/10; 617/354; 416/3, 174

[56] References Cited

U.S. PATENT DOCUMENTS 3,399,827  9/1968  Schwartzman ...................... 415/90
3,759,626  9/1973  Becker ................................ 415/90

FOREIGN PATENT DOCUMENTS 2825551  12/1979  Fed. Rep. of Germany ........ 308/10
0008396  1/1982  Japan .................................... 415/119

OTHER PUBLICATIONS

Poubeau P.C., "Satellite Flywheels with Magnetic Bearings and Passive Radial Centering", J. Spacecraft, vol. 17, No. 2 (3-4 1980), pp. 93-98.

Primary Examiner—Abraham Hershkovitz
Assistant Examiner—H. Edward Li
Attorney, Agent, or Firm—Toren, McGeady, Stanger, Goldberg & Kiel

[57] ABSTRACT

A turbo-molecular pump with passive, radial magnetic bearings and axial bearings has both direct and indirect damping arrangements for unwanted oscillations. Direct damping is produced by eddy currents produced in copper rings around the magnetic stators of the magnetic bearings. Indirect damping is provided through a platform, carried by springs and connected to the pump housing by oscillation dampers.

2 Claims, 2 Drawing Figures

PUMP WITH MAGNETIC BEARINGS

The present invention relates generally to pump bearings and more particularly concerns a pump with magnetic bearings and in particular a turbo-molecular pump with passive, radial magnetic bearings and with mechanical or electromagnetic axial bearings.

For the lubricant-free support of the rotors of turbo-molecular pumps, various versions of magnetic bearings are used. In the prior art, DAS No. 23 49 033 and FR No. 14 75 765 describe turbo-molecular pumps with active, electronically controlled magnetic bearings. In DAS No. 28 25 551 there is illustrated a turbo-molecular pump with hybrid support. The rotor is held radially by means of passive magnetic bearings, while in the axial direction mechanical bearings known as step bearings are provided.

In both types of bearings the rotors behave like elastically confined gyroscopes. Thus there are various possible modes of oscillation. The oscillations can be stimulated externally by means of vibrations or they can arise because of frictional forces in the axial mechanical step bearing as in the arrangement in DAS No. 28 25 551. Different types of rotor oscillations are possible in differing frequency ranges and they include:
1. Precession oscillations with a frequency of approximately 0.1 Hz to 10 Hz. The frequency is dependent upon the rate of rotation, the moments of inertia and the spring constants of the bearings of the rotor.
2. Parallel oscillations of the rotor perpendicular to the axis of rotation. The frequencies of these oscillations are determined by the spring constants of the magnetic bearings and by the mass of the rotor and lie between 30 Hz and 100 Hz.
3. Nutation oscillations, which are dependent upon the rate of rotation and upon the relationship of the moments of inertia along and transverse to the rotor axis. They occur in the ranges of 300 Hz to 1500 Hz.

To avoid the possible oscillations, actively controlled magnetic bearings can be damped electronically. Passive magnetic bearings disclosed in the prior art, for example in DAS No. 28 25 551 incline to oscillations of one or more of the above-mentioned types upon strong vibrations or shocks. In particular frictional forces can excite nutation oscillations when a mechanical step bearing is provided. If the amplitudes of the oscillations in the magnetic bearings exceed the amount of play provided, the rotor must be returned to its starting position by the catch bearings provided, which has as a result a strong braking and an abrasion of the catch bearing. This applies to all rotors with passive radial magnetic bearings irrespective of the type of axial bearing.

The present invention seeks to provide a pump with magnetic bearings in which oscillations are reduced. More particularly the invention seeks to provide a damping of oscillations in turbo-molecular pumps with passive radial magnetic bearings, by means of which there are damped both external oscillations and oscillations excited by the pump itself. Thus operation of the pump is ensured which does not have oscillations, is safe and is stable at all frequencies up to the rated speed.

SUMMARY OF THE INVENTION

According to the present invention there is provided a pump with radial and axial bearings, the radial bearing(s) being magnetic and comprising a rotor and a stator, the stator being provided with damping means in the form of an electrically conductive ring.

Preferably at least one magnetic bearing stator is carried by a platform which is mounted on springs and which is connected to the pump housing by means of an oscillation damper. Thus a preferred embodiment of the invention has a combination of two different damping arrangements. A direct damping arrangement for high frequencies operates with eddy current damping. It consists of rings of copper or another good electrically conducting material, which are fitted on the magnetic bearing stators of the radial magnetic bearings. When oscillations occur magnetic field alterations arise in these rings, which produce eddy currents with damping forces.

These damping forces are proportional to the frequency of the oscillations which occur and thus are especially suited to the damping of oscillations with higher frequencies.

For oscillations with lower frequencies a damping arrangement is provided which consists of a platform carrying a magnetic bearing stator and which is suspended in springs, which only permit movement perpendicular to the axial direction of the pump. The platform is connected to the stationary housing by means of oscillation absorbers. Thus the rotor is coupled to the platform by means of the radial magnetic bearing. This magnetic bearing also transfers the damping forces to the rotor. The arrangement is so designed that a sufficient damping is provided for lower frequencies. In the region of the natural frequency of the platform, which is given by the mass of the platform including magnetic bearing stator and the spring constants of the springs, the damping has a maximum. It decreases with higher frequencies.

The damping is particularly effective in the direction of the magnetic bearing planes.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE PREFERRED EMBODIMENT

Figure 1:
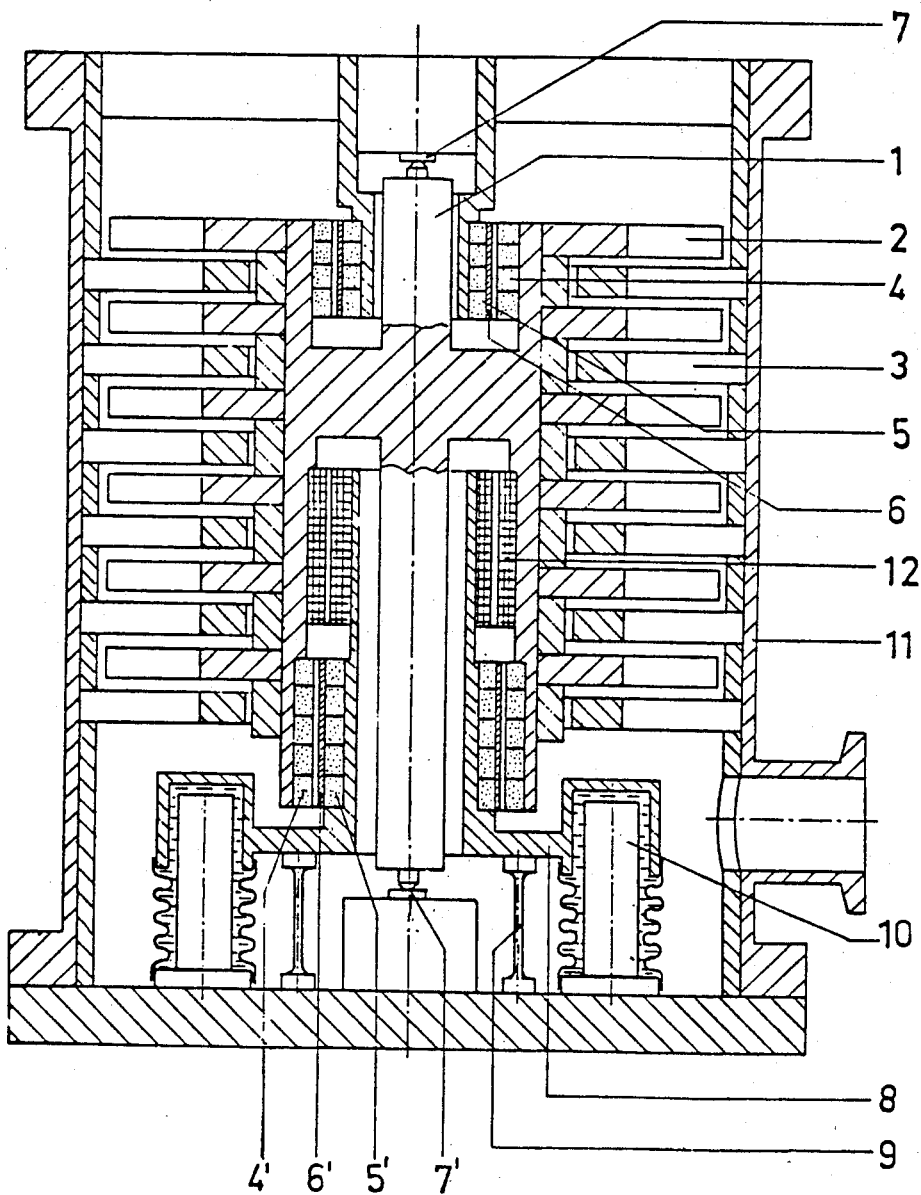
FIG. 1 is a sectional view showing a pump in accordance with the present invention.

Referring to FIG. 1 there is shown a turbo-molecular pump having a rotor 1 and rotor discs 2. Located alternately between the rotor discs 2 are stator discs 3. Radial magnetic bearings consist of magnetic bearing rotors 4 and 4' and magnetic bearing stators 5 and 5'. In the present embodiment the axial bearings are mechanical axial step or support bearings 7 and 7'. An electromagnetic arrangement can serve as an axial bearing instead. Fitted to the magnetic bearing stators 5 and 5' are rings 6 and 6' of copper or other good electrically conducting material. Upon disturbances occuring, magnetic field variations produce eddy currents in these rings, which produce frequency-proportional damping forces.

With the indirect damping for lower frequencies, movements of the platform 8 which is arranged on perpendicularly standing springs 9, excited by oscillations of the rotor, are efficiently suppressed by means of conventional fluid dampers 10. The springs 9 guide the platform 8 in the axial direction, but permit movements perpendicular thereto.

Figure 2:
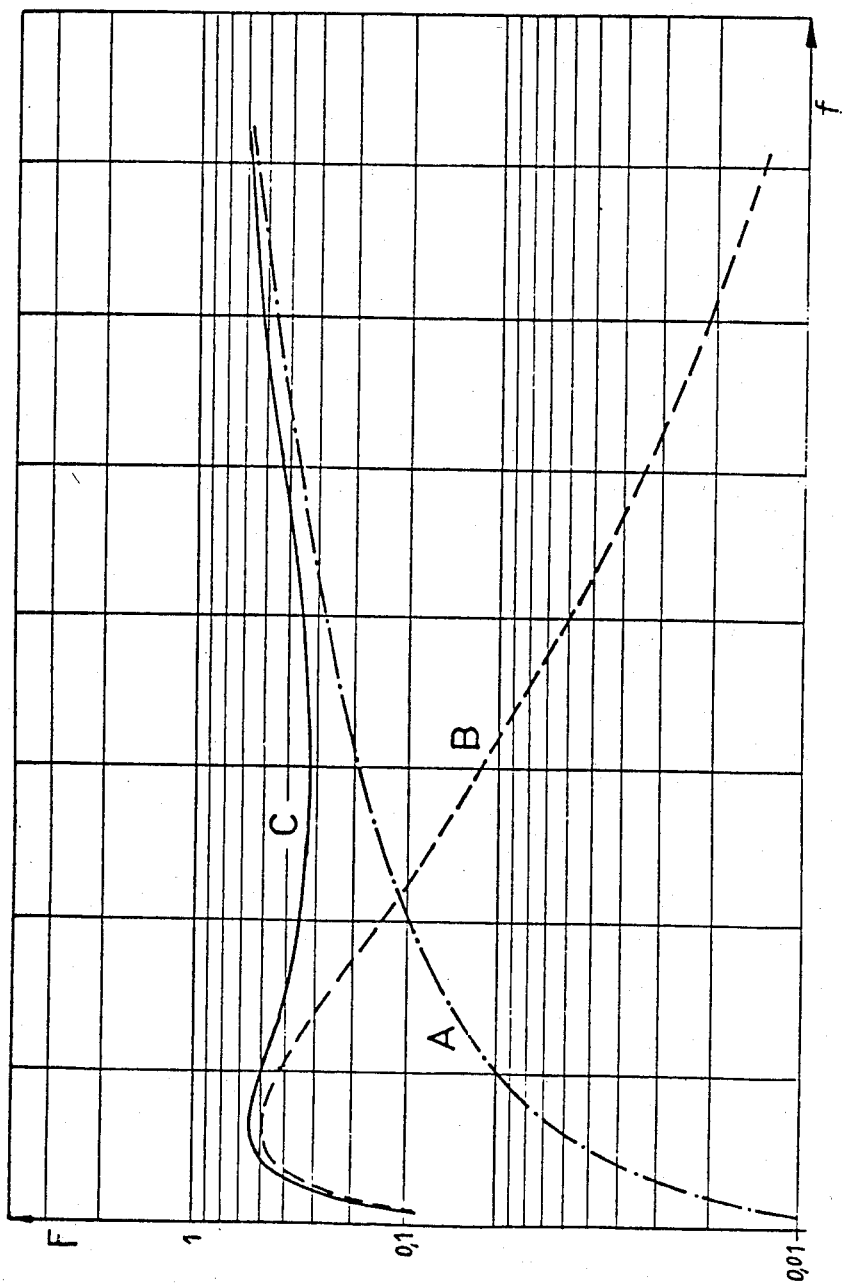
FIG. 2 is a graph showing the dependence of the damping forces on the oscillation frequency.

In FIG. 2 the plot of the damping forces is illustrated logarithmically in dependence upon the oscillation frequency. The curve A shows the plot of the direct damping forces, which are proportional to the frequency and are thus effective only at higher frequencies. Curve B illustrates the indirect damping forces, which have their greatest effect at lower frequencies in the region of the natural frequency of the platform. The curve C shows the resultant of the two curves A and B.

In curve C there are graphically illustrated the damping forces of the combined damping arrangement consisting of direct damping, and indirect damping as a function of oscillation frequency. With this combination there is obtained an effective damping over the whole range of the oscillations which occur. On account of the limited space in the air gap of the magnetic bearing an efficient direct damping is realized only for high frequencies.

The indirect damping with small frequencies is an order of magnitude larger than the direct damping.

To achieve optimal relationships, the spring constant of the springs in which the platform is suspended is matched to the spring constant of the corresponding magnetic bearing. It is also possible to attach the indirect damping to only one of the two magnet bearings, preferably at the fore-vacuum side of the pump.

Thus, by means of the invention, an efficient damping is achieved for all oscillation frequencies which occur.

While a specific embodiment of the invention has been shown and described in detail to illustrate the application of the inventive principles, it will be understood that the invention may be embodied otherwise without departing from such principles.

I claim:

1. A pump with radial and axial bearing means, said radial bearing means being magnetic and comprising a rotor part and a stator part, said stator part comprising damping means in the form of an electrically conductive ring, and a pump housing wherein at least one magnetic bearing stator is carried by a platform which is mounted on springs and which is connected to said pump housing by means of an oscillation damper, said stator part being provided with two magnetic bearing stators for each of which the spring constant of said springs is substantially equal to the spring constant of the magnetic bearing.

2. A pump with radial and axial bearing means, said radial bearing means being magnetic and comprising a rotor part and a stator part, said stator part comprising damping means in the form of an electrically conductive ring, and a pump housing wherein at least one magnetic bearing stator is carried by a platform which is mounted on springs and which is connected to said pump housing by means of an oscillation damper, said stator part being provided with two magnetic bearing stators, at one of which only ring damping means is provided, and for the other of which the spring constant of said springs is substantially equal to the spring constant of the magnetic bearing.

* * * * *